(12) United States Patent
Brozio

(10) Patent No.: US 8,944,406 B2
(45) Date of Patent: Feb. 3, 2015

(54) THROTTLE DEVICE

(75) Inventor: Michael Brozio, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 683 days.

(21) Appl. No.: 13/107,516

(22) Filed: May 13, 2011

(65) Prior Publication Data

US 2011/0278486 A1 Nov. 17, 2011

(30) Foreign Application Priority Data

May 14, 2010 (DE) .......................... 10 2010 028 982

(51) Int. Cl.
*F16K 1/22* (2006.01)
*F16C 33/76* (2006.01)
*F02D 9/10* (2006.01)

(52) U.S. Cl.
CPC .............. *F02D 9/106* (2013.01); *F16C 33/763* (2013.01); *F61K 1/2078* (2013.01)
USPC ........... 251/305; 251/308; 123/337; 384/132; 384/480; 384/488

(58) Field of Classification Search
USPC ................... 251/305, 308, 214; 123/336–338, 123/188.1, 188.6, 198 DA; 384/480, 488
See application file for complete search history.

(56) References Cited

U.S. PATENT DOCUMENTS

| | | | | |
|---|---|---|---|---|
| 3,096,070 A | * | 7/1963 | Wolfensperger | 251/214 |
| 3,256,182 A | * | 6/1966 | Scherer | 508/237 |
| 4,353,388 A | * | 10/1982 | Isoyama et al. | 137/240 |
| 5,979,871 A | * | 11/1999 | Forbes et al. | 251/305 |
| 2008/0111091 A1 | * | 5/2008 | Veinotte et al. | 251/129.12 |
| 2009/0317031 A1 | | 12/2009 | Pfundt et al. | |

FOREIGN PATENT DOCUMENTS

| | | |
|---|---|---|
| DE | 10 2004 043 125 A1 | 3/2006 |
| EP | 0 942 187 A1 | 9/1999 |
| EP | 1 126 145 A2 | 8/2001 |
| GB | 666 001 | 2/1952 |

\* cited by examiner

*Primary Examiner* — Steve Hepperle
*Assistant Examiner* — Marina Tietjen
(74) *Attorney, Agent, or Firm* — Maginot, Moore & Beck LLP

(57) ABSTRACT

A throttle device, includes a housing, a gas conduit, a throttle shaft, a throttle body movable by means of the throttle shaft. According to the invention, a bearing is provided for supporting the throttle shaft on the housing, in which for sealing off an interstice in fluid-tight fashion between the throttle shaft and the housing, and in particular outside the bearing, a viscous medium is disposed in the interstice.

16 Claims, 2 Drawing Sheets

THROTTLE DEVICE

CROSS-REFERENCE TO RELATED APPLICATION

This application is based on German Patent Application 10 2010 002 898.5 filed on May 14, 2010.

BACKGROUND OF THE INVENTION

1. Field of the Invention

The invention relates to a throttle device.

2. Description of the Prior Art

In the automotive industry, by means of a throttle device disposed in an intake tube, the amount of air for combustion available to an internal combustion engine is controlled and/or regulated, so that as a result, the mechanical power output by the engine can be controlled and/or regulated.

For this purpose, the throttle device has a housing, a gas conduit embodied in the housing, a throttle shaft, and a throttle body disposed on the throttle shaft. The throttle shaft can be moved by means of an adjusting device, such as an electric motor, so that the throttle valve also executes a motion. As a result, the flow cross-sectional area available for the flow of air through the gas conduit can be varied. The throttle shaft is supported on the housing of the throttle device with a bearing, such as a roller bearing. Outside the roller bearing, between the housing and the throttle shaft, an interstice or gap occurs. Although the throttle shall is sealed off with respect to the housing by means of one or two sealing rings, nevertheless leaks can occur at these sealing rings. Fluids, that is, liquids or gases, can enter through this interstice or gap between the housing and the gas conduit. Especially when the throttle device is used in an internal combustion engine of a motor vehicle, condensate in the form of water can form in the gas conduit. In a turbocharged internal combustion engine, relatively high pressures also occur in the gas conduit, in the range of up to 3.5 bar. As a result, the water, in the form of condensate or air or gas, can reach the roller bearing and cause damage there. In turbocharged engines, the condensed water is also at that high pressure. If the condensed water in the gas conduit is located in the vicinity of the interstice or gap that opens into the gas conduit between the housing and the throttle shaft, then that condensed water is forced into that interstice with that high pressure as well.

From German Patent Disclosure DE 10 2004 043 125 A1, a throttle device for an internal combustion engine with a throttle valve housing and with a throttle valve shaft and a throttle valve is known. The throttle valve shaft is supported pivotably in the throttle valve housing in a bearing receptacle provided on the throttle valve housing and is pivotable with the aid of an adjusting device that engages the throttle valve shaft.

SUMMARY OF THE INVENTION

A throttle device of the invention includes a housing, a gas conduit, a throttle shaft, a throttle body movable by means of the throttle shaft, a bearing for supporting the throttle shaft on the housing, in which for sealing off an interstice between the throttle shaft and the housing, and in particular outside the bearing, in fluid-tight fashion, a viscous medium is disposed in the interstice.

The interstice between the throttle shaft and the housing is necessary, because the throttle shaft is movable while the housing is fixed. The viscous medium in the interstice acts as a barrier or seal, so that no fluid can flow out of the gas conduit to the bearing. Moreover, if there is an underpressure in the gas conduit, air from the surroundings of the throttle device can be prevented from being able to flow into the gas conduit that is at underpressure.

In the housing, still other components of the throttle device, which define an interstice or a gap between the throttle shaft and the housing or the other components, are considered to be housings. Because of the existing interstice between the throttle shaft and the housing or the other components of the throttle device, in the vicinity of the interstice the throttle shaft is not supported on the housing. In particular, the housing is not a slide bearing.

In an additional feature, the volume of the interstice or gap amounts to between 50 mm$^3$ and 500 mm$^3$, in particular between 100 mm$^3$ and 300 mm$^3$, for instance between 100 mm$^3$ and 150 mm$^3$. Thus the interstice is filled by the viscous medium, so that as a result, the viscous medium acts as a barrier against the penetration of a fluid, that is, in particular air or gas, as well as condensed water.

In a further feature, the throttle body is formed as an umbrella or a shade that can be rolled up.

In particular, the viscous medium is disposed between the throttle shaft and the housing in a region between the gas conduit and the bearing.

In a further feature, the throttle shaft is provided with an annular groove, and a disk is disposed in the annular groove for axially supporting the throttle shaft.

In a supplementary embodiment, the viscous medium is disposed in an interstice between the disk and the throttle shaft at the annular groove. Thus the viscous medium is disposed in the annular groove.

Preferably, the annular groove and the disk disposed in the annular groove are disposed between the gas conduit and the bearing.

In a variant, the interstice is filled essentially completely by the viscous medium. Here, essentially completely filled means that the volume of the interstice or the gap is filled with the viscous medium to at least 80%, 90%, 95%, 98%, or 99%.

Expediently, the bearing is a roller bearing.

In an additional feature, the bearing is a slide bearing.

In a further embodiment, the throttle shaft is sealed off from the housing with a sealing ring or two sealing rings. The sealing ring is a seal of an elastic material, such as rubber or elastic plastic.

In particular, the viscous medium is an oil, such as lubricating oil, a grease, such as lubricating grease, or a gel.

In a further feature, the throttle device includes an adjusting device for pivoting the throttle shaft, and/or the throttle body is embodied as a throttle valve.

In a variant, the housing at least partly and in particular completely comprises metal, such as steel, or plastic.

An internal combustion engine of the invention has an intake tube for carrying air for combustion in the engine and a throttle device, built into the intake tube, for controlling and/or regulating the quantity of air that can be carried through the intake tube, and the throttle device is embodied as a throttle device described in this patent application.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
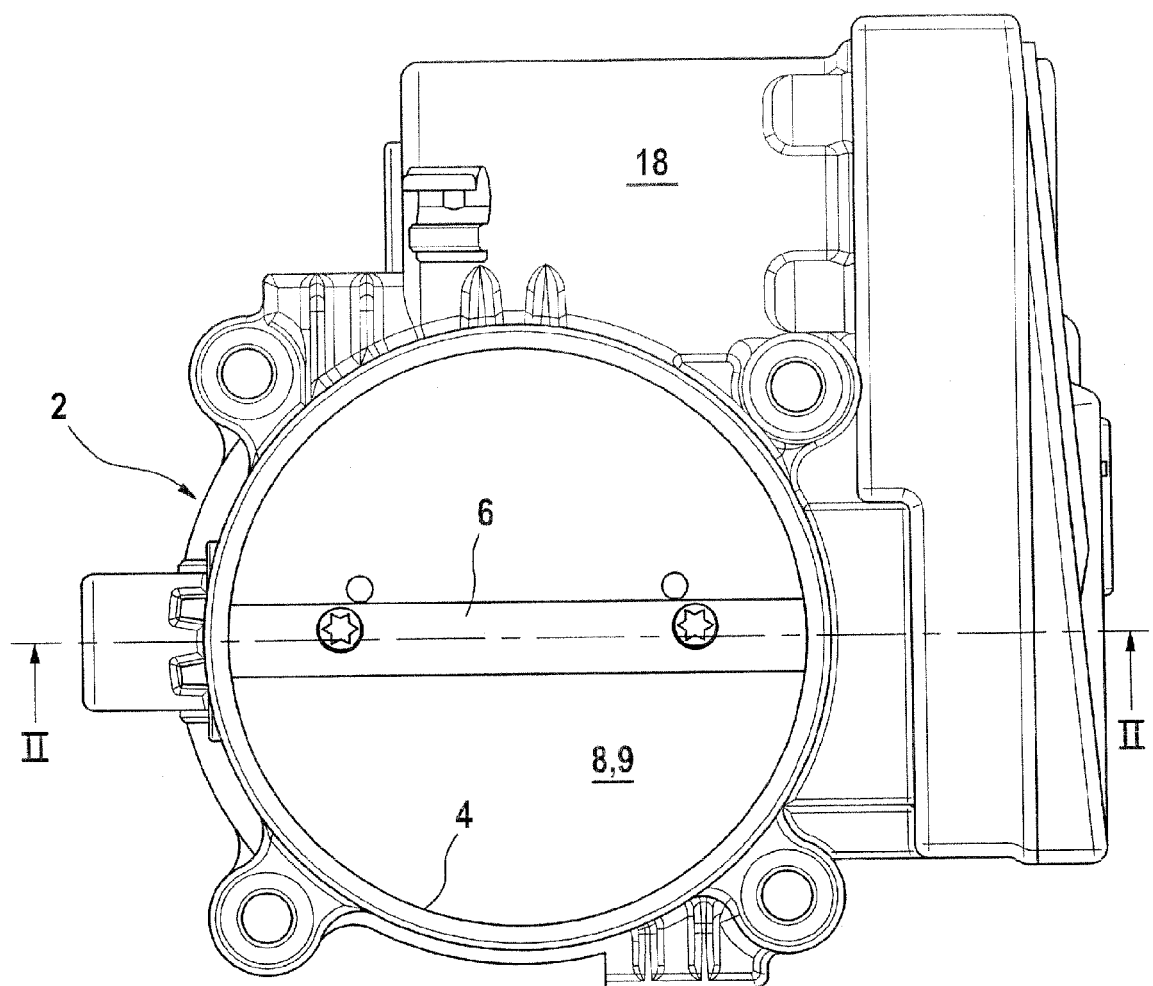
FIG. 1 is a top view of a throttle device according to the invention.

The throttle device according to the invention can be used in various internal combustion engines, in which with the aid of a throttle valve 8, a passage through a gas conduit 4 is to be controlled. The gas conduit 4 is provided in particular for a flow of air, a fuel-air mixture, and so forth. Depending on the pivoted position of the throttle valve 8, the flow of the gas is throttled to a greater or lesser degree. Normally, the throttle valve 8 can be pivoted by up to 90°. However, versions also exist in which the throttle valve 8 can be pivoted by less than 90° or more than 90°, for instance up to 180°. A throttle shaft 6 of metal, such as steel, or plastic having the throttle valve 8 can be pivoted with the aid of an adjusting device 18 engaging the throttle shaft 6. The adjusting device 18 is for instance a control motor 18 engaging the throttle shaft 6 such as an electric motor, which adjusts the throttle shaft 6 for instance directly or via a gear.

Figure 2:
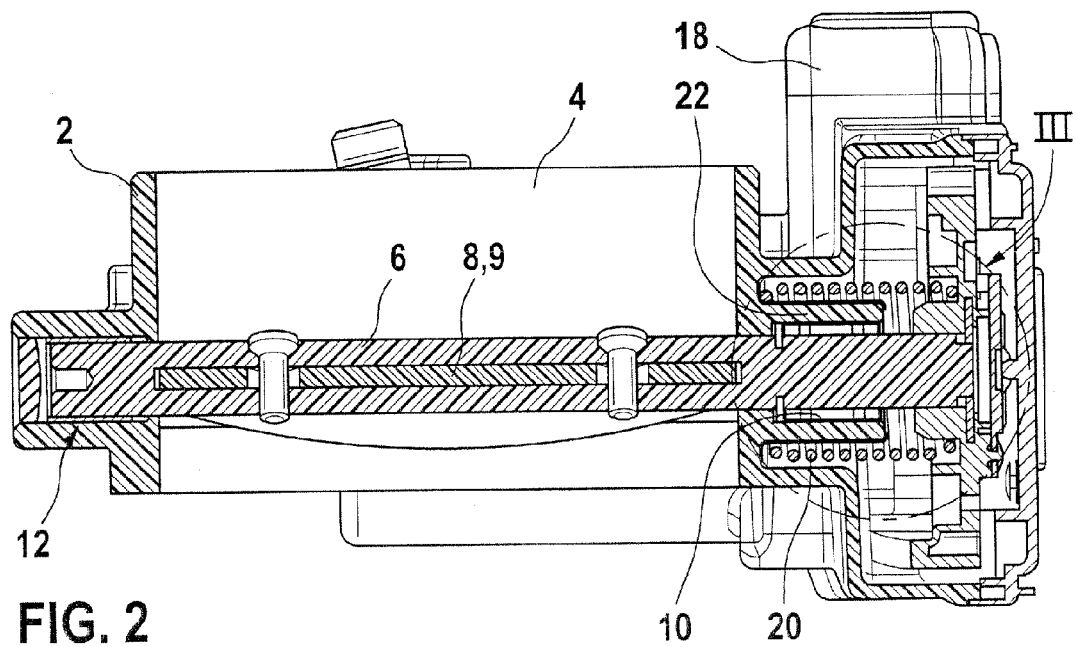
FIG. 2 is a section taken along the line II-II in FIG. 1 through the throttle device.
Figure 3:
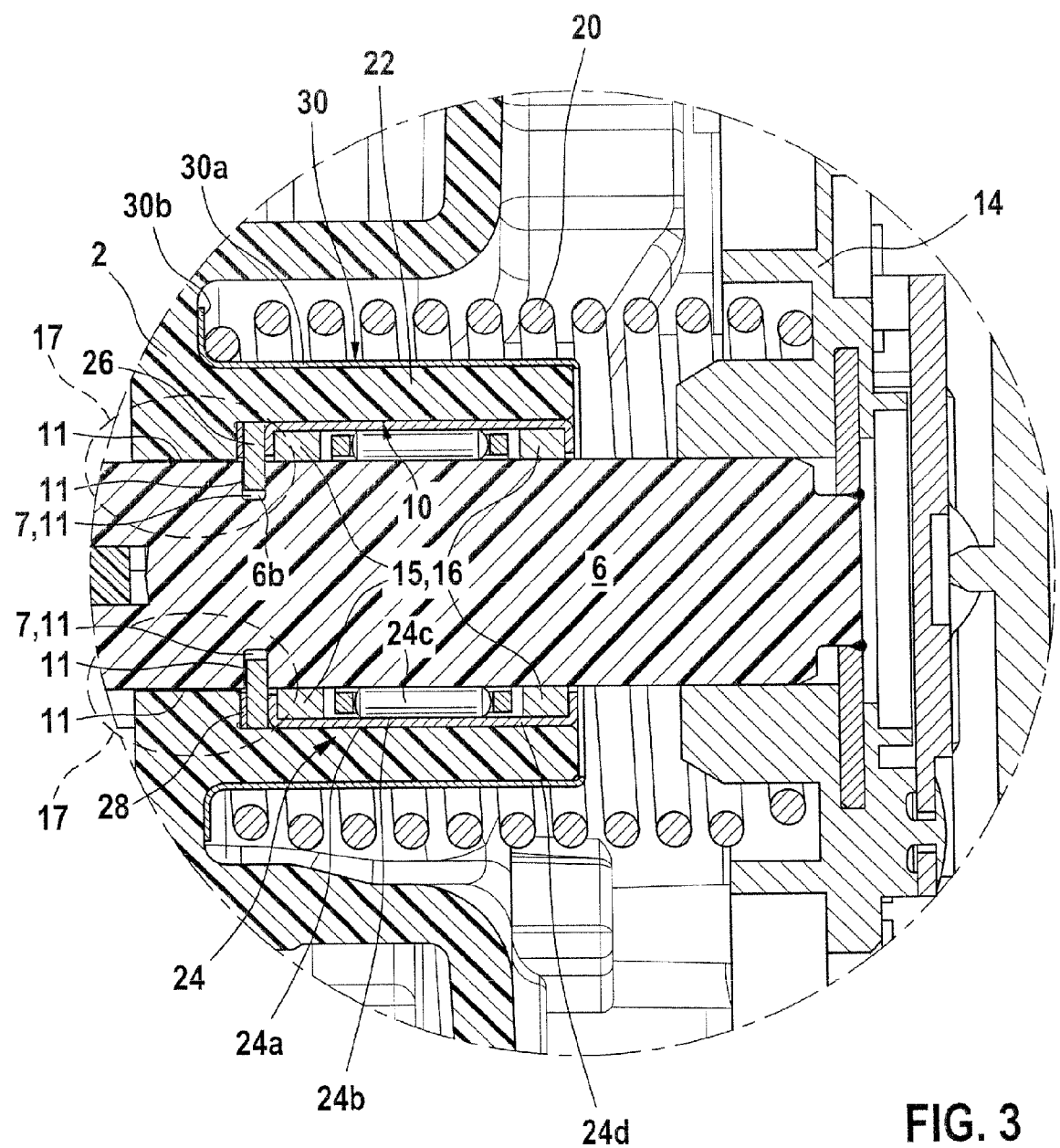
FIG. 3 is an enlarged detail of a circle marked III in FIG. 2.

FIGS. 1 through 3 show the throttle device with a housing 2. A gas conduit 4, seen in an end-on view in FIG. 1, extends through the housing 2. The gas conduit 4 is for instance part of an intake tube leading to combustion chambers of an internal combustion engine. A throttle shaft 6 supported pivotably in the housing 2 extends transversely through the gas conduit 4. A throttle valve 8 is secured to the throttle shaft 6. The throttle valve 8, as a throttle body 9, can also for instance be made in one piece of plastic together with the throttle shaft 6.

A bearing recess 10 and a further bearing recess 12 are provided on the housing 2 or throttle valve housing 2. The throttle shaft 6 is pivotably supported in the bearing recesses 10, 12.

An articulated connection means 14 is solidly connected to the throttle shaft 6. In the exemplary embodiment shown, the articulated connection means 14 is embodied in the form of a gear wheel injection-molded or welded onto the throttle shaft 6. Since the throttle valve 8 is to be pivoted by no more than 110°, for instance, it suffices if the injection-molded-on gear wheel has outer teeth over only a range of 110°, which teeth mesh with a drive pinion of a control motor via a further gear wheel. The control motor together with the further gear wheel and the articulated connection means 14 form an adjusting device 18 for adjusting the throttle valve 8 supported on the throttle shaft 6.

One end of an adjusting spring 20 is on the one hand pivotably connected directly or indirectly to the housing 2 and on the other the adjusting spring 20 is pivotably connected directly or indirectly to the throttle shaft 6 or throttle valve 8. In the exemplary embodiment shown, the right-hand end of the adjusting spring 20 acts on the throttle shaft 6, via the articulated connection means 14. The left-hand end of the adjusting spring 20 is braced on the housing 2. The adjusting spring 20 serves to restore the throttle shaft 6 or the throttle valve 8 to an unactuated position of repose.

An extension 22, protruding laterally, is formed onto the throttle valve housing 2. The extension 22 is preferably formed in one piece together with the housing 2. The extension 22 preferably comprises the same material as the housing 2. The extension 22, preferably like the rest of the housing 2, comprises a plastic. Thus the housing 2 can be produced together with the extension 22 very simply, for instance by injection molding.

The bearing recess 10 is formed for example by a stepped bore extending inward from the outside into the extension 22 of the housing 2. A bearing 24 is press-fitted with an oversize into the bearing recess 10. The diameter of the circumference 24a of the bearing 24 is greater than the diameter of the bearing recess 10 in the vicinity of the bearing 24. As a result, it is attained that the bearing 24 presses in the radial direction against the housing 2, and that the bearing 24 is not shifted by the forces that occur during the operation of the throttle device.

The bearing 24 is for instance a roller bearing 24b. In the preferred exemplary embodiment selected, the roller bearing 24b has an outer ring 24d and a plurality of rollers 24c or bearing needles, which are received in the outer ring 24d.

The circumference 24a of the outer ring 24d is dimensioned such that the outer ring 24d is retained with initial tension in the bearing recess 10.

An encompassing annular groove 6b is provided on the throttle shaft 6. A disk 26 is built into the annular groove 6b. An axially resilient wave spring washer 28 tenses the disk 26 built into the annular groove 6b against the outer ring 24d of the bearing 24. The spring washer 25 is braced on the housing 2, or more precisely on the face end of the stepped bore that forms the bearing recess 10. It is thus ensured that during the operation of the throttle device, no relative motion in the longitudinal direction of the throttle shaft 6 occurs between the disk 26 and the bearing 24, or between the disk 26 and the throttle valve housing 2.

The annular groove 6b in the throttle shaft 6 is minimally wider than the thickness of the disk 26, so that when the disk 26 is not moving, the throttle shaft 6 can easily be rotated, and there is an interstice 11 between the disk 26 and the throttle shaft 6 at the annular groove 6b.

A clamping element 30 surrounds the bearing recess 10. In the preferred exemplary embodiment selected, the clamping element 30 is provided on the outer circumference of the extension 22 of the housing 2. In the vicinity of the bearing recess 10, the clamping element 30 surrounds the extension 22 completely. In the preferred exemplary embodiment selected, the outer ring 24d of the bearing 24 presses from the inside outward against the extension 22, and the clamping element 30 presses from the outside inward against the extension 22. Because the clamping element 30 presses from outside inward radially against the extension 22, the extension 22 cannot escape, despite the radial force, acting on the extension 22, of the press-fitted bearing 24. This is true even when the extension 22, or the entire housing 2, comprises a plastic which without the proposed fastening by the clamping element 30 would yield, or if, without the stabilizing clamping element 30, the plastic would creep over the course of time.

The clamping element 30 is preferably cylindrical or sheathlike and has the approximate shape of a stepped cap-shaped cylinder, open at the face end, with a cylindrical region 30a and a radial region 30b.

The clamping element 30, viewed in the circumferential direction, is preferably closed. However, the clamping element 30 may also be slit, along a jacket line, for instance.

The clamping element 30 for instance comprises metal, preferably a hardened metal, in particular spring steel.

The adjusting spring 20 can be braced by one end at the transition between the cylindrical region 30a and the radial region 30b. This prevents the end of the adjusting spring 20 from being able to dig into the relatively soft material comprising the housing 2.

Between the extension 22 of the housing 2 and the adjusting spring 20 is the cylindrical region 30a of the clamping element 30. It is thus ensured that even under strong vibrational stress of the throttle device, the windings of the adjusting spring 20 cannot directly strike the extension 22 of the housing 2. As a result, it can be ensured, even if a relatively soft material is used for the extension 22, that the adjusting spring 20 can damage neither the extension 22 nor any other region of the throttle valve housing 2.

The material of the clamping element 30 is preferably selected such that the material of the clamping element 30 has largely the same coefficient of thermal expansion as the bearing 24, or at least as the outer ring 24d of the bearing 24. This can be achieved very simply by providing that the bearing 24, or at least the outer ring 24d of the bearing 24, comprises metal, and the clamping element 30 likewise comprises metal, so that both the clamping element 30 and the bearing 24, or the outer ring 24d of the bearing 24, have practically the same coefficients of thermal expansion. Because the coefficients of thermal expansion are the same for the bearing 24 and the clamping element 30, it is ensured that at both a very high incident operating temperature and at a very low temperature, the pressure of the material of the extension 22 or the throttle valve housing 2 between the bearing 24 and the clamping element 30 remains the same, practically unchanged.

In a region 17 shown in dashed lines in FIG. 3 between the housing 2 and the disk 26 as well as the throttle shaft 6, the interstice 11 or gap 11 occurs. The interstice 11 is shown in FIG. 3 partly only as a line or straight line. The interstice 11 between the housing 2 and the throttle shaft 6 is shown as a straight line, and the interstice 11 between the disk 26 and the throttle shaft 6 at the annular groove 6b is also partly shown as a straight line. Only in the vicinity of a radially inner end of the disk 26 and in the radially lower inner end of the annular groove 6b at the throttle shall 6 is the interstice 11 not shown as a straight line but rather as a free space. A viscous medium 7, such as grease or lubricating grease, is disposed in this interstice 11. The viscous medium 7 fills the interstice 11 completely, so that the viscous medium 7 has a sealing effect. The viscous medium 7 acts as a barrier for the fluids, from the gas conduit 4, penetrating through the interstice 11 in the direction of the roller bearing 24b. If for instance the throttle device is used in a turbocharged engine, high pressures in the range between three and four bar occur in the gas conduit 4, along with pressure surges. Both for the gas and condensed water disposed in the gas conduit 4, this high pressure is operative. As a result, gas or condensed water could penetrate from the gas conduit 4 through the interstice 11 in the direction of the roller bearing 24b. Because of the filling of the interstice 11 with the viscous medium 7, essentially no further penetration of these fluids from the gas conduit 4 to the roller bearing 24b is possible.

Viewed in the axial direction, there are two seals 15, embodied as sealing rings 16, on the two end regions of the roller bearing 24b. The sealing rings 16 comprise an elastic material, such as plastic or rubber, and serve the purpose of additional sealing off of the throttle shaft 6 in the axial direction from the housing 2. The sealing rings 16 are elastically prestressed between the outer ring 24d or the extension 22 and the throttle shaft 6.

Viewed overall, substantial advantages are associated with the throttle device of the invention. Because the interstice 11 between the housing 2 or the disk 26 and the throttle shaft 6 is filled with the viscous medium 7, the tightness between the housing 2 and the throttle shaft 6 can be increased substantially at little effort and expense and in a way that is simple to produce, without the use of additional parts.

The foregoing relates to a preferred exemplary embodiment of the invention, it being understood that other variants and embodiments thereof are possible within the spirit and scope of the invention, the latter being defined by the appended claims.

The invention claimed is:

1. A throttle device, including:
a housing;
a gas conduit embodied in the housing;
a throttle shaft disposed in the gas conduit;
a throttle body disposed in the throttle shaft and movable by means of the throttle shaft; and
a bearing disposed outside the gas conduit for supporting the throttle shaft on the housing, the bearing defining an interior space in which the throttle shaft is located and an exterior space located outside the bearing and the interior space, an interstice between the throttle shaft and the housing, and a viscous medium disposed in the exterior space located outside the bearing and in the interstice, wherein the throttle shaft is provided with an annular groove, and a disk for axially supporting the throttle shaft is provide in the annular groove, and wherein the viscous medium is disposed in an interstice between the disk and the throttle shaft at the annular groove.

2. The throttle device as defined by claim 1, wherein the annular groove and the disk disposed in the annular groove are disposed between the gas conduit and the bearing.

3. The throttle device as defined by claim 2, wherein the interstice is essentially filled completely by the viscous medium.

4. A throttle device, including:
a housing;
a gas conduit embodied in the housing;
a throttle shaft disposed in the gas conduit;
a throttle body disposed in the throttle shaft and movable by means of the throttle shaft; and
a bearing disposed outside the gas conduit for supporting the throttle shaft on the housing, the bearing defining an interior space in which the throttle shaft is located and an exterior space located outside the bearing and the interior space, an interstice between the throttle shaft and the housing, and a viscous medium disposed in the exterior space outside the bearing and in the interstice, wherein the viscous medium is disposed between the throttle shaft and the housing, in a region between the gas conduit and the bearing, wherein the throttle shaft is provided with an annular groove, and a disk for axially supporting the throttle shaft is provided in the annular groove, and wherein the viscous medium is disposed in an interstice between the disk and the throttle shaft at the annular groove.

5. The throttle device as defined by claim 4, wherein the annular groove and the disk disposed in the annular groove are disposed between the gas conduit and the bearing.

6. The throttle device as defined by claim 5, wherein the interstice is essentially filled completely by the viscous medium.

7. The throttle device as defined by claim 6, wherein the bearing is a roller bearing.

8. The throttle device as defined by claim 7, wherein the throttle shaft is sealed off with respect to the housing by a sealing ring or by two sealing rings.

9. The throttle device as defined by claim 8, wherein the viscous medium includes one of an oil, a lubricating oil, a grease, a lubricating grease, and a gel.

10. The throttle device as defined by claim 9, wherein the throttle device includes one of an adjusting device coupled to the throttle shaft and configured to pivot the throttle shaft, and the throttle body is embodied as a throttle valve.

11. The throttle device, including:
a housing;
a gas conduit embodied in the housing;
a throttle shaft disposed in the gas conduit;
a throttle body disposed in the throttle shaft and movable by means of the throttle shaft; and
a bearing disposed outside the gas conduit for supporting the throttle shaft on the housing and an interstice between the throttle shaft and the housing, wherein a viscous medium is disposed in the interstice in a region seen in the direction of the throttle shaft between the gas conduit and the bearing, wherein the throttle shaft is provided with an annular groove, and a disk for axially supporting the throttle shaft is provided in the annular groove, and wherein the viscous medium is disposed in an interstice between the disk and the throttle shaft at the annular groove.

12. The throttle device as defined by claim 11, wherein the interstice is essentially filled completely by the viscous medium.

13. The throttle device as defined by claim 11, wherein the bearing is a roller bearing.

14. The throttle device as defined by claim 11, wherein the throttle shaft is sealed off with respect to the housing by a sealing ring or by two sealing rings.

15. The throttle device as defined by claim 11, wherein the viscous medium includes one of an oil, a lubricating oil, a grease, a lubricating grease, and a gel.

16. The throttle device as defined by claim 11, wherein the throttle device includes one of an adjusting device coupled to the throttle shaft and configured to pivot the throttle shaft, and the throttle body is embodied as a throttle valve.

* * * * *